United States Patent
Murakami et al.

(10) Patent No.: US 6,786,816 B2
(45) Date of Patent: Sep. 7, 2004

(54) INSIDE/OUTSIDE AIR SWITCHING DEVICE FOR VEHICULAR AIR CONDITIONING UNIT

(75) Inventors: Hironobu Murakami, Hekinan (JP); Mitsuru Kosaka, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/623,937

(22) Filed: Jul. 18, 2003

(65) Prior Publication Data

US 2004/0067728 A1 Apr. 8, 2004

(30) Foreign Application Priority Data

Jul. 19, 2002 (JP) ........................................ 2002-211219

(51) Int. Cl.[7] ................................................ B60H 1/00

(52) U.S. Cl. .................. 454/139; 454/143; 237/12.3 B

(58) Field of Search ................................ 454/121, 146, 454/143; 165/41, 42; 237/12.3 B

(56) References Cited

U.S. PATENT DOCUMENTS

| | | | | |
|---|---|---|---|---|
| 4,223,754 A | * | 9/1980 | Mizuno et al. | ................ 180/90 |
| 4,531,671 A | * | 7/1985 | Schwenk | ................ 237/12.3 B |
| 5,967,890 A | * | 10/1999 | Loup et al. | ................ 454/121 |
| 6,499,508 B2 | | 12/2002 | Sato et al. | |
| 6,622,787 B1 | * | 9/2003 | Toyoshima et al. | ......... 165/203 |
| 6,669,548 B2 | * | 12/2003 | Fujiwara | ...................... 454/143 |

* cited by examiner

Primary Examiner—Derek S. Boles
(74) Attorney, Agent, or Firm—Harness, Dickey & Pierce, PLC

(57) ABSTRACT

In an inside/outside air switching device, a rotary door includes a rotation shaft, a periphery wall rotating about the rotation shaft, and side plates connecting between the ends of the periphery wall and the rotation shaft. The rotary door is supported in a case for opening and closing an inside air introduction port and an outside air introduction port of the case. When the door partially opens the inside air introduction port and mainly opens the outside air introduction port in an air mixing mode, the periphery wall projects toward the outside air introduction port by a predetermined distance. The projected portion of the periphery wall is covered with a cover member disposed on a cowl.

12 Claims, 7 Drawing Sheets

INSIDE/OUTSIDE AIR SWITCHING DEVICE FOR VEHICULAR AIR CONDITIONING UNIT

CROSS REFERENCE TO RELATED APPLICATION

This application is based on Japanese Patent Application No. 2002-211219 filed on Jul. 19, 2002, the disclosure of which is incorporated herein by reference.

FIELD OF THE INVENTION

The present invention relates to an inside/outside air switching device having a rotary door for a vehicular air conditioning unit.

BACKGROUND OF THE INVENTION

In recent years, it has been desired to reduce noise generated by a vehicular air conditioning unit. In response to the desire, for example, inside and outside air introduction ports of an inside/outside air switching device are enlarged so that an air intake resistance of a blower unit, which is provided downstream of the inside/outside air switching device, is reduced.

In the inside/outside air switching device, an inside/outside air switching door is moved against dynamic pressure of outside air during a vehicle running. With regard to the door for such inside/outside air switching device, a rotary door is proposed. The rotary door can be operated by a less power against dynamic pressure and can open and close the enlarged air introduction ports, as compared with a general plate like door.

The rotary door has a rotation shaft, a periphery wall rotating about the rotation shaft, and side plates connecting axial ends of the periphery wall and the rotation shaft. The rotary door is rotatably supported in a case of the inside/outside air switching device. The case has a separation wall between the inside air introduction port and the outside air introduction port. The rotary door is disposed such that the periphery wall passes through an inner peripheral side of the separation wall. Also, there is a clearance defined between the partition wall and the periphery wall to facilitate rotation of the door.

The rotary door generally has sealing members at its periphery to create seal between itself and the inside air introduction port and the outside air introduction port during an outside air mode and inside air mode, respectively. However, in an air mixing mode, the door is moved at a position that the door slightly opens the inside air introduction port and mainly opens the outside air port to partially mix inside air inside a passenger compartment with outside air outside the passenger compartment.

At this time, the sealing members separate from sealing surfaces formed on peripheries of the inside air introduction port and the outside air introduction port. Thus, the inside air introduction port communicates with the outside air introduction port through the clearance between the partition wall and the periphery wall. As a result, it is likely that rainwater, which has entered from the outside air introduction port, flows in the passenger compartment through the clearance.

SUMMARY OF THE INVENTION

The present invention is made in view of the foregoing matter and it is an object of the present invention to provide an inside/outside air switching device having a rotary door capable of restricting water such as rainwater from entering in a passenger compartment along a periphery wall of the rotary door.

According to an aspect of the present invention, an inside/outside air switching device for an air conditioning unit of a vehicle includes a case defining an air passage through which air flows, a rotary door rotatably supported in the case and a cover member. The case forms a first port through which inside air inside a compartment is introduced and a second port through which outside air outside the compartment is introduced. The rotary door selectively opens and closes the first port and the second port. The rotary door includes a rotation shaft, a periphery wall moved about a rotation shaft, and side walls connecting between axial ends of the periphery wall and the rotation shaft. In an air mixing mode, the rotary door is disposed such that the periphery wall projects toward the second port by a predetermined distance so that the door slightly opens the first port and mainly opens the second port. The cover member is disposed to cover a projected portion of the periphery wall.

Accordingly, the cover member restricts water such as rainwater from dropping on the projected portion of the periphery wall. Therefore, it is less likely that the water flows in the passenger compartment along the periphery wall. Preferably, the second port is located under an outside air intake port of a cowl of a vehicle and the cover member is disposed adjacent to the cowl.

According to another aspect of the present invention, an inside/outside air switching device for a vehicular air conditioning unit includes a case defining a first port and a second port, a rotary door rotatably supported in the case, and an elastic sealing member. The case has an intermediate wall between the first port and the second port, and the intermediate wall defines a sealing surface on a perimeter of the second port. The rotary door is disposed to selectively open and close the first port and the second port. The rotary door includes a rotation shaft, a periphery wall rotating about the rotation shaft, side walls connecting between axial ends of the periphery wall and the rotation shaft, and a sealing portion at an end of the periphery wall. The sealing portion is brought into contact with the sealing surface of the case when it fully opens the second port. The elastic sealing member is disposed to create seal between the intermediate wall and the periphery wall when the door partially opens the first port and mainly opens the second port in an air mixing mode.

Accordingly, the elastic sealing member restricts water from entering the compartment along the periphery wall in the air mixing mode. Further, it is less likely that outside air directly flows in the compartment through a clearance between the periphery wall and the intermediate wall in the air mixing mode.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Embodiments of the present invention will be described with reference to drawings.

First Embodiment

Figure 1:
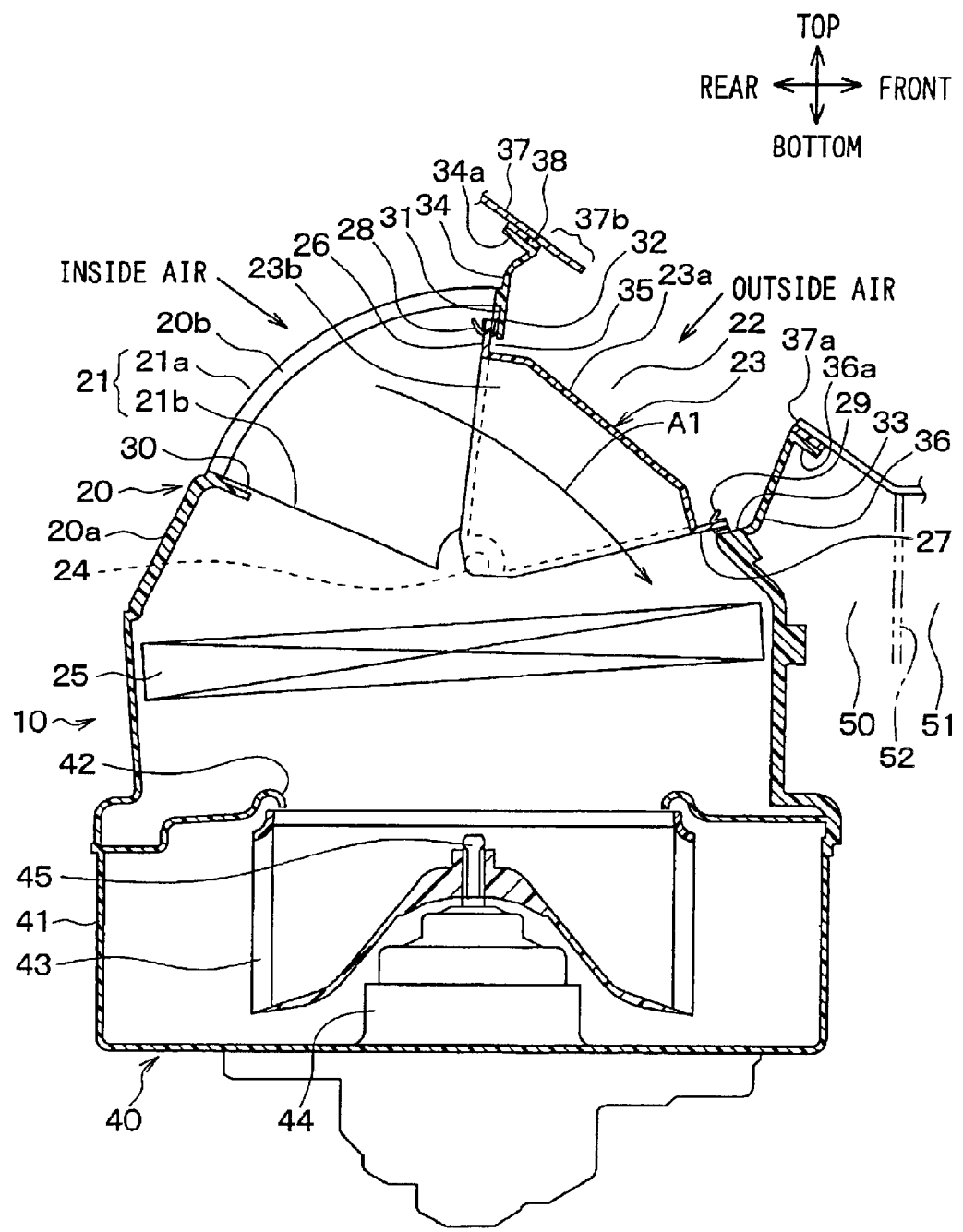
FIG. 1 is a schematic cross-sectional view of an inside/outside air switching device according to the first embodiment of the present invention.

As shown in FIG. 1, a blower unit 10 includes an inside/outside air switching device 20. The blower unit 10 is installed generally under an instrument panel, which is located at a front side in a passenger compartment of a vehicle (not shown), on a front passenger's side. In FIG. 1, top/bottom and front/rear arrows denote an actual arrangement direction of the blower unit 10 on the vehicle. The inside/outside air switching device 20 is located on the top side of the blower unit 10 and a blower 40 is located under the inside/outside air switching device 20.

The inside/outside air switching device 20 includes a resinous case 20a defining an air passage therein. The resinous case 20a is formed with an inside air introduction port 21 from which inside air inside the passenger compartment is introduced and an outside air introduction port 22 from which outside air outside the passenger compartment is introduced.

An inside/outside air switching door 23 is rotatably supported in the case 20a to selectively open and close the inside air introduction port 21 and the outside air introduction port 22. The inside/outside air switching door 23 is a rotary door having a periphery wall 23a that is rotatable about a rotation shaft 24. The structure of the rotary door 23 will be described later in detail.

An air filter 25 is arranged under the rotation shaft 24 in the inside/outside air switching device 20, that is, arranged air-downstream of the rotation shaft 24. The air filter 25 removes dusts in the air.

The blower 40 includes a resinous scroll casing 41 formed with an air introduction port 42 in a shape of bell mouth. The scroll casing 41 is disposed such that the air introduction port 42 is located downstream of the air filter 25. A centrifugal multi-blade fan (sirocco fan) 43 is arranged in the middle of the scroll casing 41. The fan 43 is connected to a rotation shaft 45 of a motor 44. By rotation of the fan 43, air is sucked from the air introduction port 42 and blown in a radially outward direction of the fan 43.

An air outlet port (not shown) of the scroll casing 41 connects to an air conditioning unit (not shown). The air conditioning unit generally accommodates a heat exchanger for cooling, a heat exchanger for heating, a temperature adjusting device, an air blowing mode switching device and the like. The air from the blower 40 is blown into the passenger compartment after its temperature is controlled in the air conditioning unit such as by cooling, dehumidifying, and reheating.

Next, the rotary door 23 will be described in detail with reference to FIGS. 2 and 3. The door 23 have the periphery wall 23a and fan-shaped side plates (side walls) 23b. The periphery wall 23a extends along the rotation direction of the door 23 (vehicle front and rear direction). The side plates. 23b radially expand from the rotation shaft 24 and connect between the axial ends of the periphery wall 23a and the rotation shaft 24.

The door 23 has a predetermined size to close the inside air introduction port 21 with the periphery wall 23a and side plates 23b. Also, the door 23 closes the outside air introduction port 22 with the periphery wall 23a.

The inside air introduction port 21 is constructed of the first opening 21a corresponding to the periphery wall 23a and second openings 21b corresponding to the side plates 21b in the axial direction of the rotation shaft 24.

Thus, the inside air introduction port 21 opens in the form of gate. That is, it opens in the radial direction and the axial direction. This increases an opening area for sucking the inside air. Because an air introduction rate increases, cooling capacity of an inside air mode improves. On the contrary, the outside air introduction port 22 has generally rectangular-shaped plane opening and is closed with the periphery wall 23a.

The rotary door 23 rotates in a direction substantially perpendicular to the flow direction of the outside air, which flows substantially in the top/bottom direction. Thus, dynamic pressure of the outside air does not affect on the rotation of the door 23. Accordingly, the door 23 can be rotated by a small power.

Because the air introduction port 21 has the gate-shaped opening as described above, the case 20a is provided with curved connecting ribs 20b to increase strength of the case 20a. The connecting ribs 20b connect the front ends and the rear ends of the first opening 21a at the axial sides of the first opening 21a.

The rotation shafts 24 of the door 23 protrude axially outward from the rotation central positions of the side plates 23b. The rotation shafts 24 are rotatably supported in bearing holes (not shown) formed on the right and left walls of the case 20a.

The door 23 is generally rotated by an electric actuator including a servomotor via the rotation shafts 24. Alternatively, the door 23 can be operated by a hand-operated lever (inside/outside air switching member) provided on an air conditioner control panel (not shown). The operation of the lever is transmitted to the rotation shafts 24 such as via a cable or a link mechanism.

Also, an inside space of the door 23 surrounded by the periphery wall 23a and side plates 23b communicates outside of the case 20a. Therefore, air can pass through the inside space of the door 23 as shown by an arrow Al in FIGS. 1 and 3. The periphery wall 23a, the side plates 23b and the rotation shafts 24 are integrally molded into the door 23 by resin having elasticity and mechanical strength such as polypropylene.

Next, a sealing structure of the rotary door 23 will be described. The door sealing structure is in a lip seal-type to reduce the power required to rotate the door 23. The door 23 has flanges 26 and 27 on peripheries of the periphery wall 23a and the side plates 23b, as shown in FIG. 1. Sealing member 28, 29 in the form of lips (thin plates) are attached on the flanges 26, 27, as shown in FIGS. 2 and 3.

Figure 3:
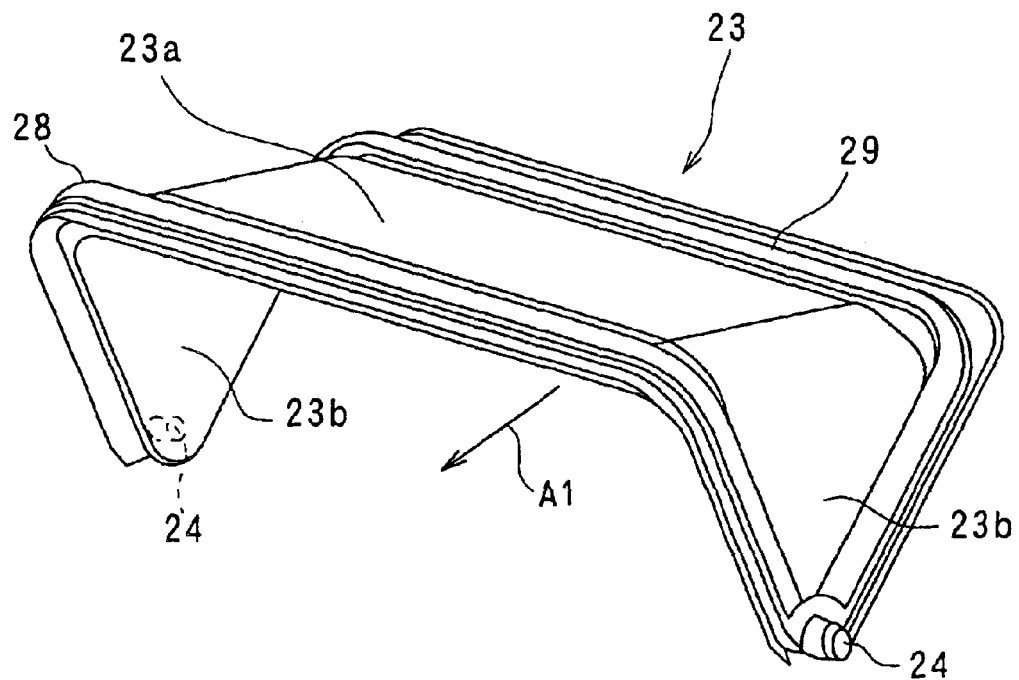
FIG. 3 is a perspective view of the door according to the first embodiment of the present invention.

The sealing members 28 and 29 are attached to the opposite sides of the door 23 with respect to the rotation direction of the door 23, as shown in FIG. 3. The sealing members 28, 29 are made of elastomer (high polymer rubber). Specifically, the sealing member 28, 29 covers both the surfaces of the flanges 26, 27. Also, the sealing member 28, 29 protrude in the form of lip and are elastically deformable.

The case 20a has sealing surfaces 30, 31, 32, 33 along peripheries of the inside air introduction port 21 and the outside air introduction port 22. The sealing members 28, 29 are brought into contact with the sealing surfaces 30, 31, 32, 33 and elastically deformed.

The case 20a is formed with a first separation wall (intermediate wall) 34 between the inside air introduction port 21 and the outside air introduction port 22. The first separation wall 34 defines the rear end of the outside air introduction port 22. The sealing surface 31, 32 are formed on front and rear surfaces of the first separation wall 34. The end of the first separation wall 34 is spaced from the periphery wall 23a so that a clearance 35 is defined between the first separation wall 34 and the periphery wall 23a. The periphery wall 23a moves radially inside of the first separation wall 34. Also, the case 20a is formed with a second separation wall 36 defining a front end of the outside air introduction port 22. The sealing surface 33 is formed on the base of the second separation wall 36.

As shown in FIG. 1, the case 20a is disposed such that the outside air introduction port 22 is located under an outside air intake port 37a of a cowl 37. Here, the cowl 37 is a panel located above a dash panel 52, which is disposed to separate the passenger compartment 50 from an engine compartment 51. The cowl 37 generally forms a space for housing a wiper link and a wiper motor. The cowl 37 also forms a drain passage through which water (e.g. rainwater) flowing a windshield drains.

The top ends 34a, 36a of the separation walls 34, 36 are pressed against the bottom surface of the cowl 37 through an elastic sealing member 38 made of urethane. Thus, the top ends 34a, 36a of the separation walls 34, 36 are sealed with the bottom surface of the cowl 37 by the sealing member 38 around the outside air intake port 37a.

Figure 4:
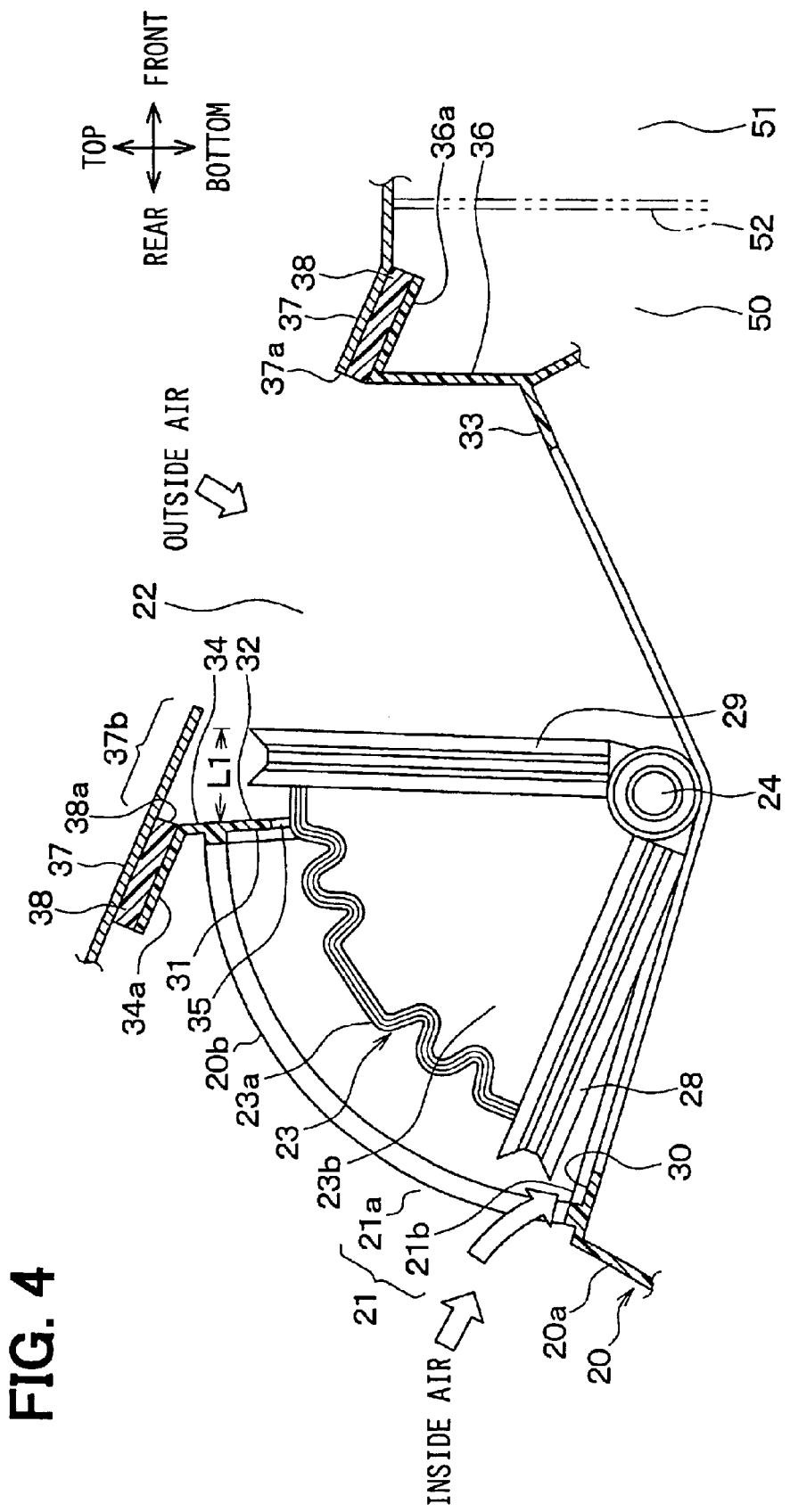
FIG. 4 is a cross-sectional view of a part of the inside/outside air switching device in an air mixing mode according to the first embodiment of the present invention.
Figure 5:
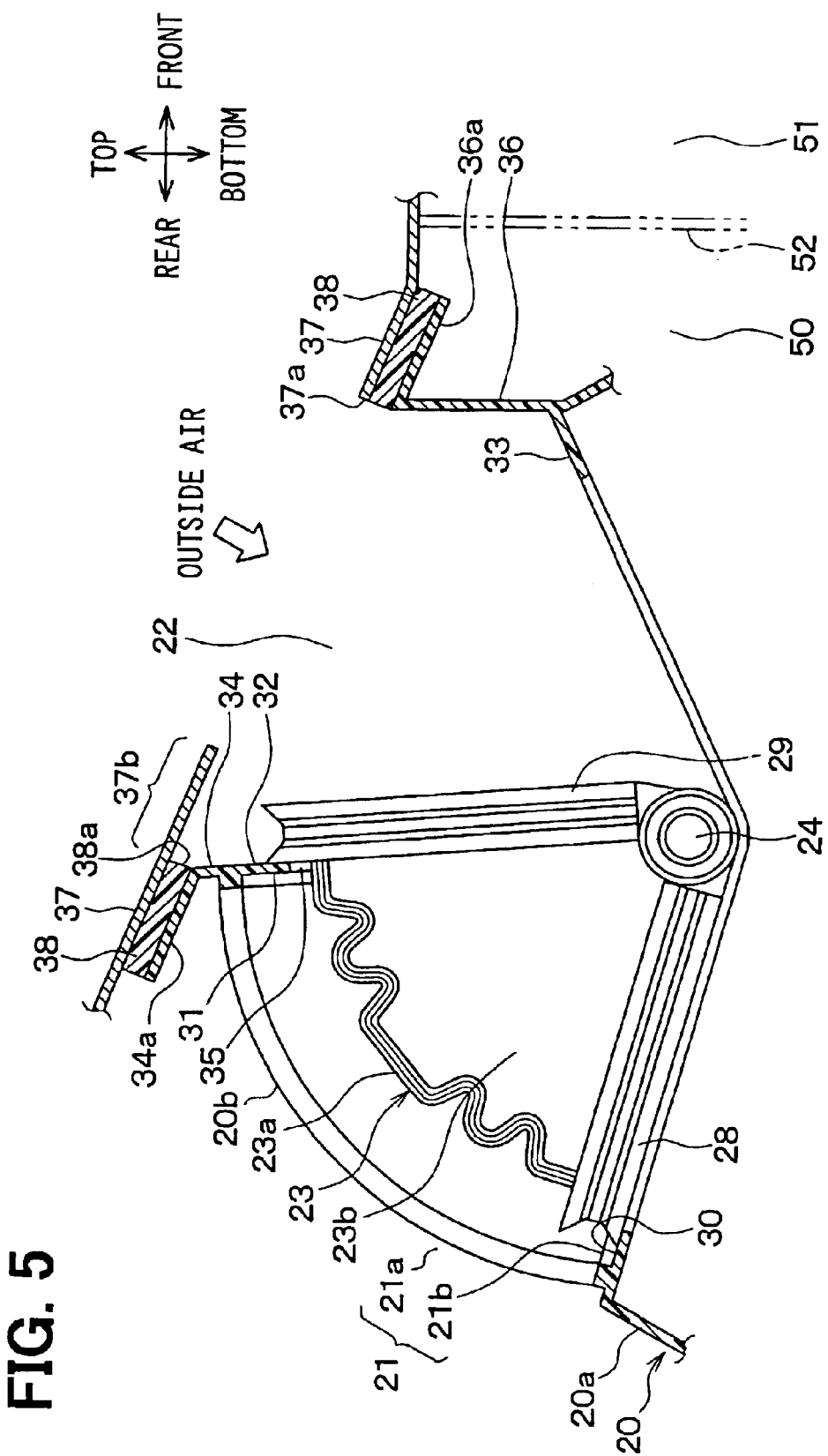
FIG. 5 is a cross-sectional view of the part of the inside/outside air switching device in an outside air mode according to the first embodiment of the present invention.

Next, a main part of the embodiment will be described more in detail with reference to FIGS. 4 through 6. In an outside air and partial inside air mode (hereinafter, referred to as an air mixing mode), the rotary door 23 mainly opens the outside air introduction port 22 and partially opens the inside air introduction port 21, so that the inside air is partially introduced with the outside air, as shown in FIG. 4. In an outside air mode, the door 23 fully opens the outside air introduction port 22 and closes the inside air introduction port 21, as shown in FIG. 5. In an inside air mode, the door 23 fully opens the inside air introduction port 21 and closes the outside air introduction port 21, as shown in FIG. 6.

Figure 2:
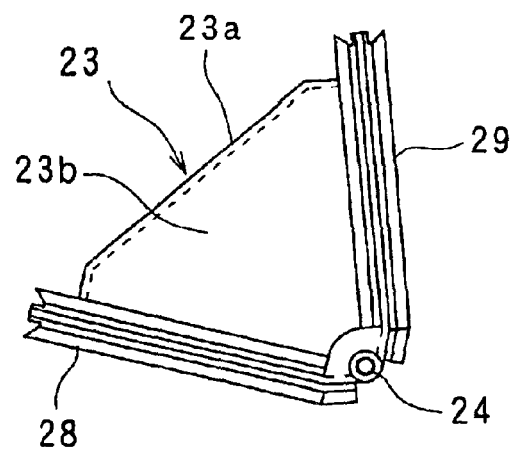
FIG. 2 is an end view of a rotary door of the inside/outside air switching device according to the first embodiment of the present invention.
Figure 6:
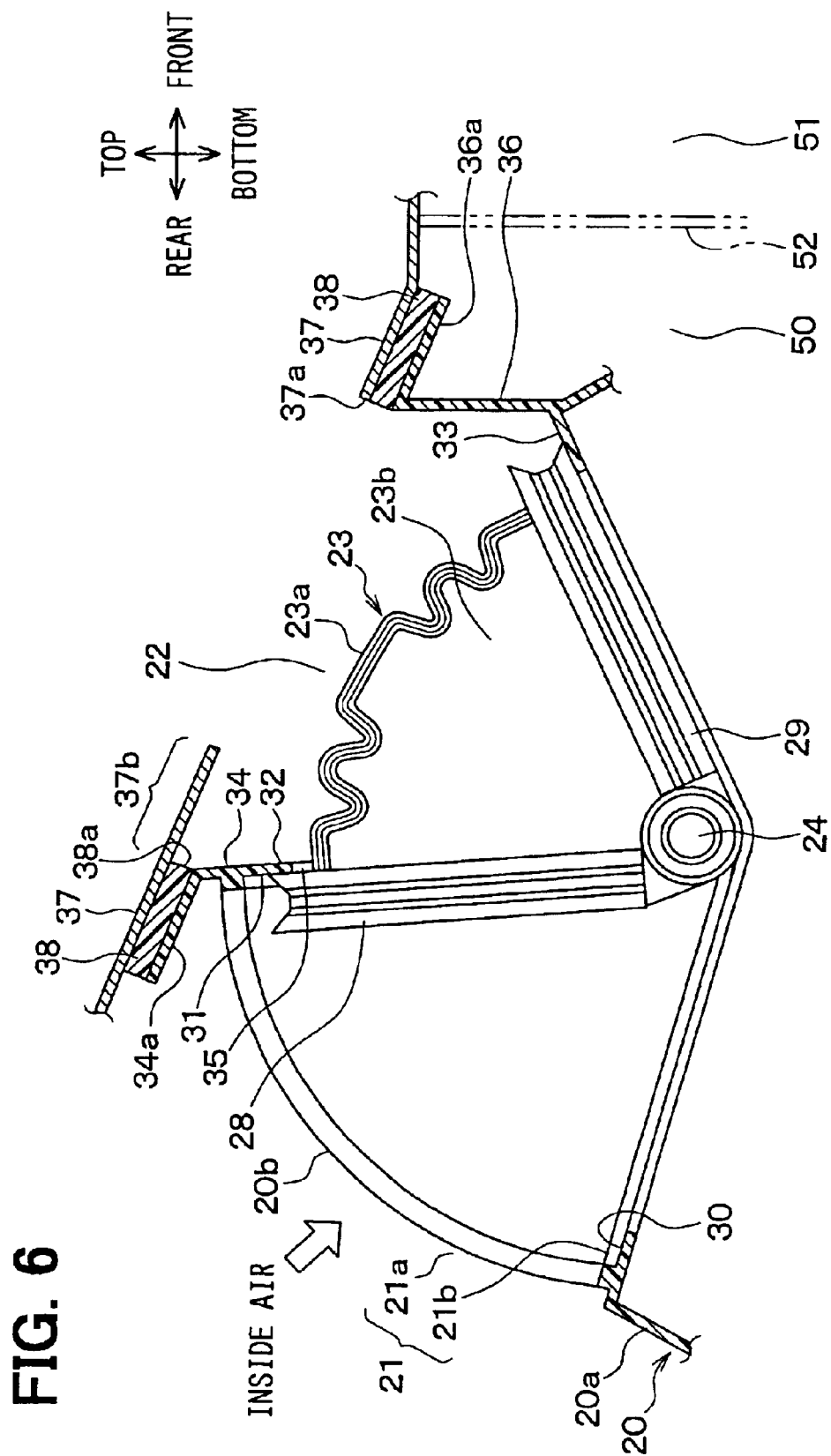
FIG. 6 is a cross-sectional view of the part of the inside/outside air switching device in an inside air mode according to the first embodiment of the present invention.

Although the periphery wall 23a shown in FIGS. 1 through 3 is in a form of substantially flat plate, the periphery wall 23a can have a shape shown in FIGS. 4 through 6. Specifically, the periphery wall 23a can have basically an arc shape having a predetermined radius with respect to the rotation shafts 24, and is partly corrugated so that projections or recessions are formed on the periphery wall 23a.

The projections or recessions of the periphery wall 23a reflects air blowing noise generated by the fan 41 toward the inside of the case 20a, especially in the inside air mode. Therefore, it is less likely that the noise will be released from the inside air introduction port 21 to the passenger compartment. Thus, this corrugated periphery wall 23a can be used in place of the flat periphery wall 23a in a case that the noise reduction is more required.

In the air mixing mode, the door 23 is moved to a position that the sealing members 28, 29 of the door 23 slightly separate from the sealing surfaces 30, 32 of the case 20a. Thus, the periphery wall 23a projects from the sealing surface 32 toward the outside air introduction port 22 by a predetermined distance (length) L1, as shown in FIG. 4.

The sealing member 38, which is attached on the bottom surface of the cowl 37, has an opening 38a. The opening 38a has the same size as the outside air introduction port 22. The cowl 37 includes a cover portion 37b in a shape of eaves. The cover portion 37b covers the portion of the periphery wall 23a that is projected from the sealing surface 32 in the air mixing mode. The cover portion 37b projects from the rear end of the opening 38a of the sealing member 38 (in other words, the sealing surface 32) toward the outside air introduction port 37a by a predetermined distance (length). Here, the distance of the cover portion 37b is greater than the distance L1 of the periphery wall 23a.

Thus, a cross-section of the opening of the outside air introduction port 37a is smaller than cross-sections of the opening of the outside air introduction port 22 and the opening 38a of the sealing member 38. The cowl 37 is made of a metal sheet, more specifically, an iron sheet with a thickness about 1.0 mm. Preferably, the cover 37b and the cowl 37 are integrally formed from the iron sheet.

Next, advantageous effects of the embodiment will be described. In the air mixing mode, the rotary door 23 is moved to the position that the sealing members 28, 29 slightly separate from the sealing surface 30, 32 of the case 20a. Thus, the outside air introduction port 22 communicates with the inside air introduction port 21 through the clearance 35 defined between the periphery wall 23a and the ends of the sealing surfaces 31, 32.

Figure 8:
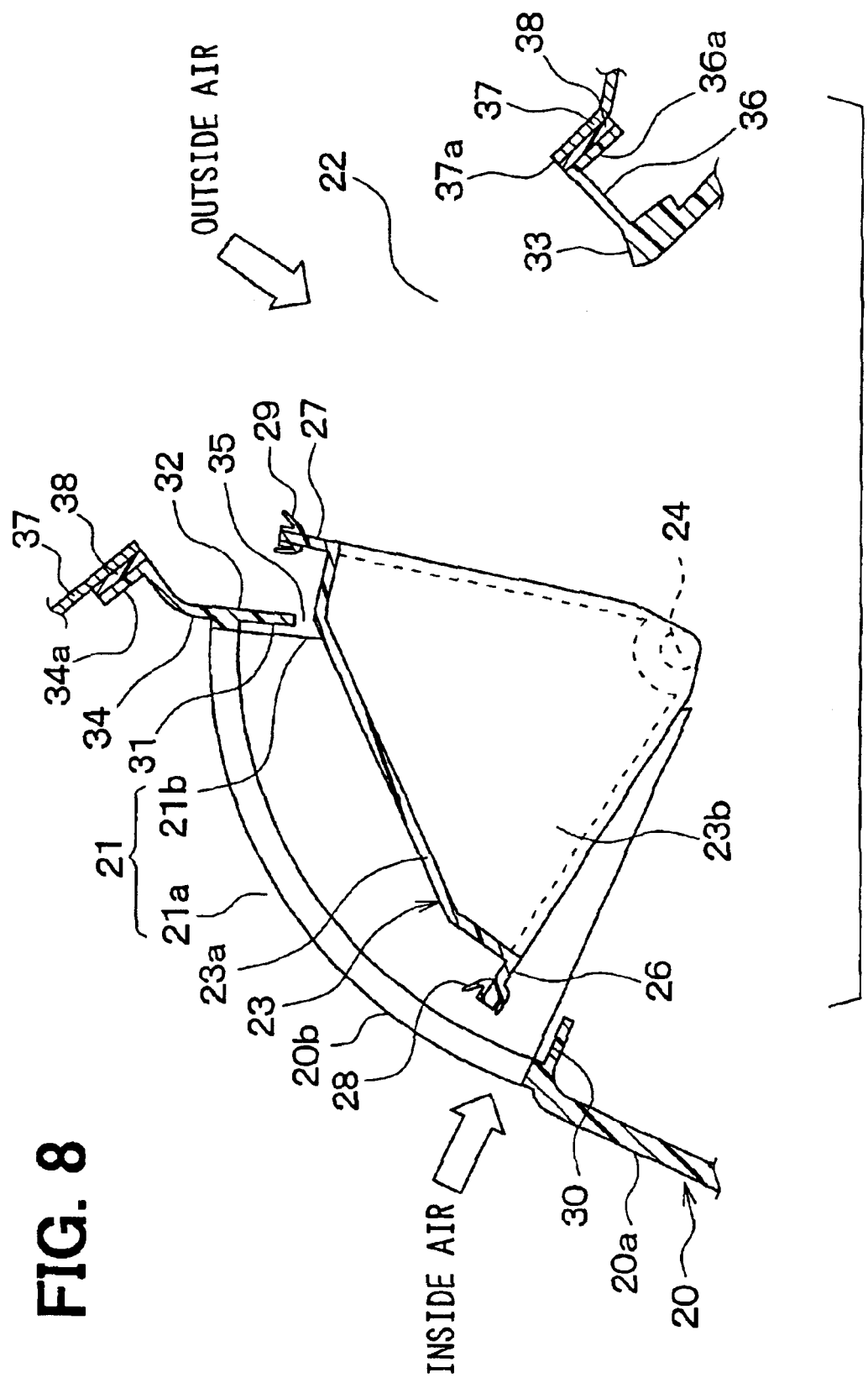
FIG. 8 is a schematic cross-sectional view of a part of an inside/outside air switching device for a comparison with the first and second embodiments.

At this time, if the cowl 37 does not have the cover portion 37b as shown in FIG. 8, water (e.g. rainwater), which has entered from the outside air introduction port 22 drops on the periphery wall 23a and flows in the passenger compartment through the clearance 35.

In the embodiment, since the cover portion 37b is provided to project over the projected portion (L1) of the periphery wall 23a, it restricts water from dropping on the projected portion of the periphery wall 23a. Therefore, it is less likely that the water flows along the periphery wall 23a and enters the passenger compartment through the clearance 35.

The water flowing in the case 20a from the outside air introduction port 37a and 22 passes through the air filter 25 and the scroll casing 41. Although not illustrated, the water is then discharged to the outside of the vehicle through a condensed water drain passage formed adjacent to an evaporator of the air conditioning unit.

The air mixing mode is set to improve heating capacity in a case that heating capacity is insufficient. The warm air (inside air) is partially mixed to outside cold air so that the temperature of the air blown into the passenger compartment increases. This is for example performed when a temperature of hot water (engine coolant), which is heat source of the heat exchanger for heating, is low in a warm-up time for heating in the cold weather such as in winter.

In cold weather, the windows are easily fogged during the heating. Thus, the ratio of the inside air mixed to the outside air in the air mixing mode is set approximately ten percent to restrict the fog of the windows. With this, the distance L1 is set small, so the dimension of the cover portion 37b can be also small.

As a result, even when the opening area of the outside air introduction port 37a of the cowl 37 is smaller than that of the outside air introduction port 22 and the opening 38a of the sealing member 38 due to the cover 37b, a resistance to introduce the outside air does not increase largely. Therefore, the cover portion 37b is less likely to affect an outside air introduction rate.

Since the cover portion 37b is integrally formed with the cowl 37, it is easily formed. Also, manufacturing costs reduce. The cowl 37 and the separation wall 34 are sealed around the outside air introduction port 22 by the sealing member 38. Further, the cover portion 37b projects, from the opening 38a of the sealing member 38 to the front side of the vehicle. Accordingly, it restricts rainwater from entering the passenger compartment.

Second Embodiment

Figure 7:
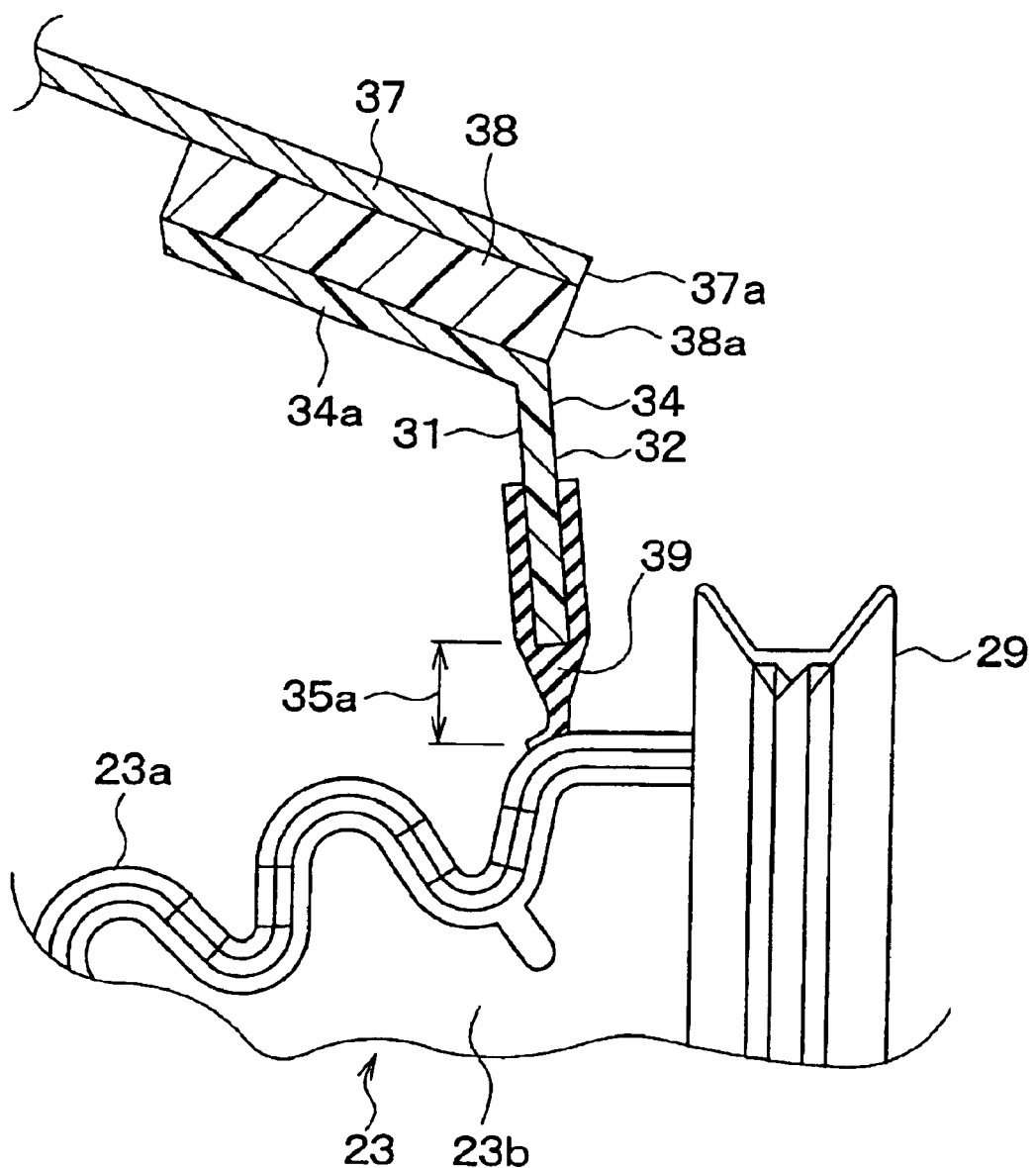
FIG. 7 is a partial enlarged view of a part of an inside/outside air switching device, partly includes a cross-section, according to the second embodiment of the present invention.

In the second embodiment, the entering of water through the clearance 35 is restricted by a means different from the cover portion 37b of the first embodiment. As shown in FIG. 7, an auxiliary elastic sealing member 39 is attached on the ends of the sealing surfaces 31, 32 of the first separation wall 34. The auxiliary sealing member 39 is made of the same material (elastomer rubber) as the sealing member 28, 29 attached on the door 23. The auxiliary sealing member 39 is attached to cover the ends of the sealing surfaces 31, 32 from the left end to the right end in the form of sheet.

The sealing member 39 protrudes toward the periphery wall 23a and its end bends on the periphery wall 23a to be in press contact with the periphery wall 23a. Thus, the auxiliary elastic sealing member 39 seals the portion 35a (corresponding to the clearance 35 of the first embodiment) between the end of the partition wall 34 and the periphery wall 23a.

Therefore, it is less likely that the water flows along the periphery wall 23a and enters the passenger compartment in the air mixing mode. Further, it is less likely that the cold outside air directly enters the passenger compartment through the clearance 35.

Because the auxiliary elastic sealing member 39 is attached on the ends of the sealing surfaces 31, 32 of the first separation wall 34, the sealing members 28, 29 of the door 23 contact the auxiliary elastic sealing member 39 and create seal between them in the outside air mode and the inside air mode.

Further, since the auxiliary sealing member 39 bends on the periphery wall 23a, the end of the auxiliary sealing member 39 securely contact the periphery wall 23a and maintains an air-tightness therebetween.

Other Embodiments

One of the second openings 21b, which opens in the axial direction and corresponds to the axial side plates 23b of the door 23, can be closed with a wall. The wall can be used as a fixing surface on which an actuator of the door 23 is fixed. Also, a supporting member for supporting a rotation central point of the link member can be fixed on the wall, for example.

The present invention should not be limited to the disclosed embodiments, but may be implemented in other ways without departing from the spirit of the invention.

What is claimed is:

1. An inside/outside air switching device for an air conditioning unit of a vehicle comprising:

a case defining an air passage through which air flows, the case forming a first port through which inside air inside a compartment is introduced and a second port through which outside air outside the compartment is introduced;

a rotary door rotatably supported in the case for selectively opening and closing the first port and the second port, wherein the rotary door includes a rotation shaft, a periphery wall moved about a rotation shaft, and side walls connecting between axial ends of the periphery wall and the rotation shaft, wherein in an air mixing mode the rotary door is disposed such that the periphery wall projects toward the second port by a predetermined distance so that the rotary door partially opens the first port and mainly opens the second port; and a cover member disposed to cover a projected portion of the periphery wall.

2. The inside/outside air switching device according to claim 1, wherein the case is disposed such that the second port is located under an outside air intake port of a cowl of the vehicle, and the cover member is disposed adjacent to the cowl.

3. The inside/outside air switching device according to claim 2, wherein the cover member and the cowl are formed into a single panel.

4. The inside/outside air switching device according to claim 1, wherein the case includes a first sealing surface and a second sealing surface at a periphery of the second port, the first sealing surface is farther away than the second sealing surface with respect to the first port, and the door includes an elastic sealing portion that is brought into contact with the first sealing surface when the door fully opens the first port and the second sealing surface when the door opens the second port, wherein the cover member is disposed such that it projects from the second sealing surface toward the second port.

5. The inside/outside air switching device according to claim 4, wherein the case is disposed such that the first port is located behind the second port with respect to a vehicle front and rear direction.

6. The inside/outside air switching device according to claim 2, wherein the case is sealed with the cowl around the second port by an elastic member.

7. An inside/outside air switching device for a vehicular air conditioning unit comprising:

a case defining a first port through which inside air inside a compartment is introduced and a second port through which outside air outside the compartment is introduced, wherein the case has an intermediate wall between the first port and the second port, and the intermediate wall defines a sealing surface on a perimeter of the second port;

a rotary door rotatably supported in the case for selectively opening and closing the first port and the second port, wherein the rotary door includes a rotation shaft, a periphery wall rotating about the rotation shaft, side walls connecting between axial ends of the periphery wall, and first and second sealing portions formed at ends of the periphery wall, and the first sealing portion is brought into contact with the sealing surface of the case when the rotary door fully opens the second port; and an elastic sealing member disposed to create seal between the intermediate wall and the periphery wall when the rotary door partially opens the first port and mainly opens the second port in an air mixing mode.

8. The inside/outside air switching device according to claim 7, wherein the elastic sealing member is provided at an end of the intermediate wall.

9. The inside/outside air switching device according to claim 7, wherein the intermediate wall defines another sealing surface on a perimeter of the first port so that the second sealing portion of the rotary door is brought into contact with the another sealing surface when it fully opens the first port, and wherein the elastic sealing member is disposed to cover the ends of the sealing surfaces.

10. The inside/outside air switching device according to claim 7, wherein the periphery wall of the rotary door is partly corrugated.

11. The inside/outside air switching device according to claim 7, wherein the elastic sealing member is disposed such that its end is bent along the periphery wall when creating seal between the intermediate wall and the periphery wall.

12. The inside/outside air switching deice according to claim 7, wherein the case is disposed such that the second port is adjacent to an outside air intake port of a cowl of the vehicle, wherein the case is sealed with the cowl around the second port.

* * * * *